United States Patent [19]

Dankman et al.

[11] Patent Number: 5,491,609
[45] Date of Patent: Feb. 13, 1996

[54] PORTABLE ELECTRONIC PLATFORM SYSTEM

[75] Inventors: Scott Dankman, Reston; Roc A. Lastinger, Springfield, both of Va.

[73] Assignee: TelePad, Herndon, Va.

[21] Appl. No.: 202,491

[22] Filed: Feb. 28, 1994

[51] Int. Cl.⁶ ............................... G06F 1/16; H05K 7/10
[52] U.S. Cl. ........................ 361/686; 361/683; 361/731
[58] Field of Search ..................... 364/708.1; 345/169; 439/928; 312/223.2; 361/680–686, 725–727, 730, 731

[56] References Cited

U.S. PATENT DOCUMENTS

| | | | |
|---|---|---|---|
| 4,545,023 | 10/1985 | Mizzi | 361/680 X |
| 4,749,364 | 7/1988 | Arney et al. | |
| 4,827,408 | 5/1989 | Shimomura | 395/275 |
| 4,891,810 | 1/1990 | de Corlieu et al. | |
| 4,894,792 | 1/1990 | Mitchell et al. | |
| 4,941,841 | 7/1990 | Darden et al. | |
| 4,969,830 | 11/1990 | Daly et al. | |
| 4,978,949 | 12/1990 | Herron et al. | |
| 5,014,193 | 5/1991 | Garner et al. | |
| 5,030,128 | 7/1991 | Herron et al. | |
| 5,049,862 | 9/1991 | Dao et al. | |
| 5,058,045 | 10/1991 | Ma | |
| 5,111,196 | 5/1992 | Hunt | |
| 5,115,374 | 5/1992 | Hongoh | |
| 5,121,295 | 6/1992 | Lam | |
| 5,124,887 | 6/1992 | Kobayashi | |
| 5,126,954 | 6/1992 | Morita | |
| 5,139,439 | 8/1992 | Shie | |
| 5,157,585 | 10/1992 | Myers | |
| 5,182,699 | 1/1993 | Kobayashi et al. | |
| 5,193,051 | 3/1993 | Ma | 361/681 X |
| 5,194,852 | 3/1993 | More et al. | |
| 5,202,817 | 4/1993 | Koenck et al. | |
| 5,278,730 | 1/1994 | Kikinis | 361/686 |
| 5,325,262 | 6/1994 | Ma | 361/683 X |

FOREIGN PATENT DOCUMENTS

| | | |
|---|---|---|
| 62-184686 | 8/1987 | Japan . |
| 62-185293 | 8/1987 | Japan . |

*Primary Examiner*—Michael W. Phillips
*Attorney, Agent, or Firm*—Finnegan, Henderson, Farabow, Garrett & Dunner

[57] ABSTRACT

A portable platform system for connecting an external module having a module connector to a portable electronic platform having a flat panel display, a central processing unit and a system bus includes at least two docking bays disposed on a rear side of the flat panel display including at least first, second, and third rails and an electrical connector. An external module of a first width is slid in between the first and second adjacent rails to be secured to the rear side of the flat panel display, and the module connector is connected to the electrical connector of the docking bay to electrically connect the module to the central processing unit via the system bus. An external module of a second width greater than the width of the first module is slid between the first and third rails and straddles the second rail sliding the two inner rails of the module between the two outer rails of the docking bay, and the module connector is connected to the electrical connector of the docking bay to electrically connect the module to the central processing unit via the system bus.

5 Claims, 8 Drawing Sheets

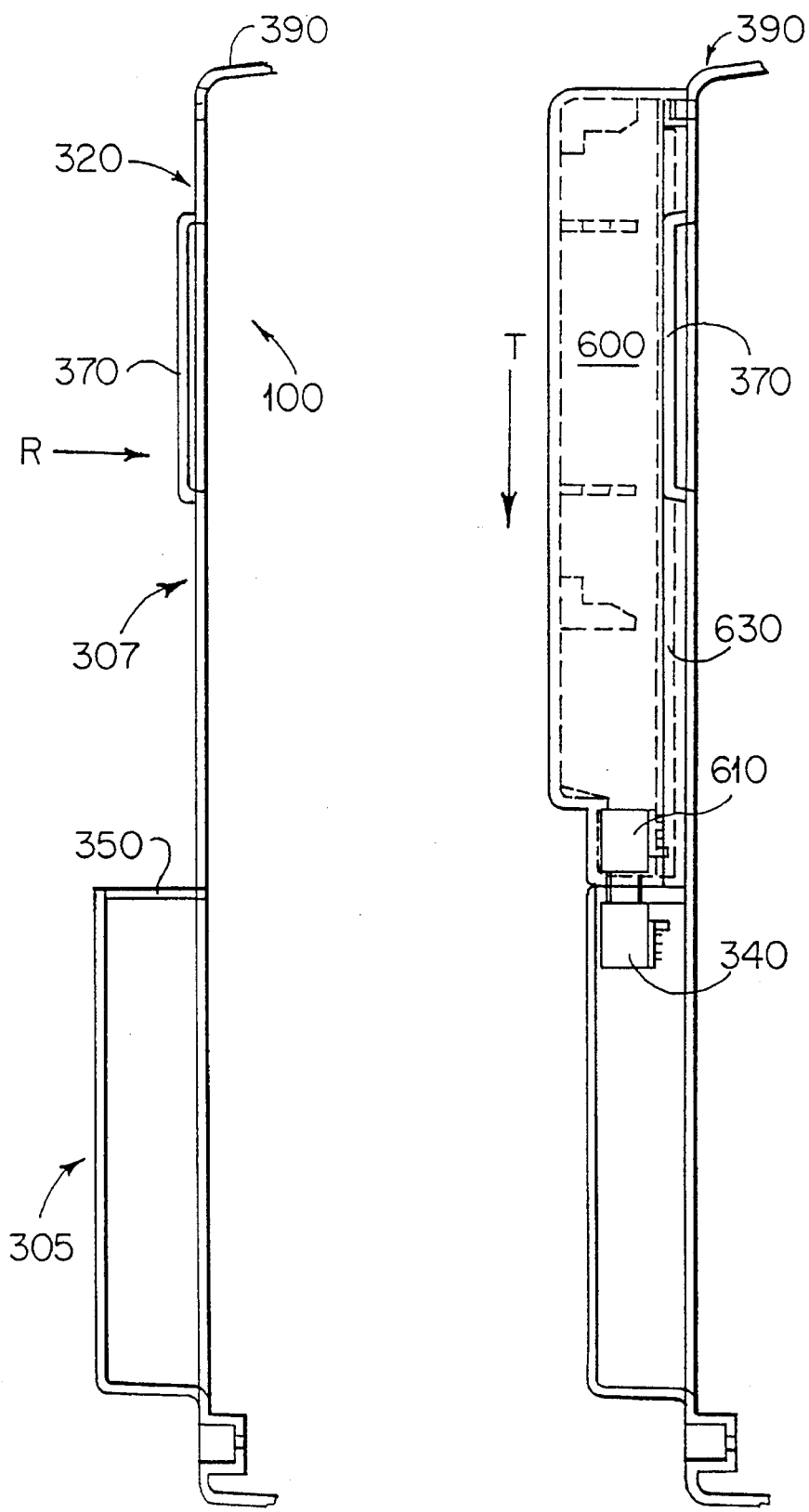

PORTABLE ELECTRONIC PLATFORM SYSTEM

BACKGROUND OF THE INVENTION

1. Field of the Invention

This invention relates to portable personal computers and, more particularly, to multifunctional portable electronic platforms. The invention facilitates connecting various external modules including independent functioning devices to an electronic platform using exterior grooves and guides in the platform.

2. Description of Related Art

In recent years, the computer industry has seen enormous growth in the market for personal computers that are commonly referred to as notebook and subnotebook personal computers. These types of personal computers are generally popular because of their small size, light weight, and overall portability.

While manufacturers of notebook and subnotebook personal computers have enjoined success of their products for a number of years, this success was not without a price to users. In order to make their personal computers lightweight, and therefore popular, manufacturers had to sacrifice certain devices. That is, they had to take out devices generally included in the shell or frame of the notebook or subnotebook computer. For example, they took out floppy drives that were previously standard parts of a notebook computer. In this way they decreased the total functionality of the notebook and subnotebook computers.

In some cases, however, notebook computer manufacturers added external connectors and included internal PCMCIA slots using an industry standard 68 pin connector in the notebooks and subnotebooks so the functionality of these computers could be enhanced by connecting them to external devices using the connectors or by connecting them to standard PCMCIA cards. Using internal PCMCIA slots and cards (with limited standard sizes) to connect external devices can make these notebook and subnotebook computers less portable and, perhaps, less attractive to users.

The growth of the personal computer market in the last few years has also lead to expanded use of personal computers for many functions. For example, companies have added devices like CD-ROM drives (and related software) that can transform a personal computer into a multimedia system that can use full motion video (and related sound) stored on a compact disk ("CD"). Companies have also added global positioning systems ("GPS"), which can identify a location (latitude and longitude) in the world, to personal computers to create electronic mobile mapping systems, which can use the location identified by the GPS with special software in the personal computer to specify a location on maps of the world. However, at the present time, these multifunctional systems are not very portable. For example, multimedia personal computers tend to be very large. Furthermore, conventional systems do not allow a user to easily convert a personal computer from a multimedia system into an electronic mapping system or a video teleconferencing system.

With regard to portability, sales of notebook personal computers with a pen tablet (or other means for using a special pen pointer indicator, etc.) to enter information or otherwise instruct the computers has also grown. In other words, with pen-based computers, users do not need to use keyboards or other input devices, such as a mouse, to enter information into or to issue instructions to the computer. With pen-based computers, users can simply write on a tablet that, at least in portable notebook computers, is usually the screen of the computer. The computer then interprets the user's writing as either text, graphics, or commands. However, these pen-based computers suffer the same drawbacks as other notebook personal computers, that is, as manufacturers made them smaller functionality suffered. Increasing the functionality of these systems generally results in a decrease in their portability. Furthermore, conventional systems do not allow a user to easily transform a pen-based portable computer into a multimedia system, an electronic mapping system, or a video teleconferencing system.

In summary, current notebook, subnotebook, and pen-based portable computers do not provide a great deal of flexibility to users. Conventional computers do not provide the capability to change their configuration by simply sliding an external module of any size, for example, a CD-ROM module or GPS module, into an external docking bay on a computer that transforms the computer (with the added module) into a new system with enhanced functionality.

OBJECTS AND SUMMARY OF THE INVENTION

It is therefore an object of the present invention to provide for a portable electronic platform.

It is a further object of the present invention to provide a system for integrating modules to a portable electronic platform.

Another object of the present invention to provide grooves and guides on the exterior of a portable electronic platform for integrating modules to the platform.

It is also an object of the present invention to provide for a pen-based notebook computer with a configuration that can be changed by simply sliding an external module (of any size) onto an external docking bay on the computer that transforms the computer (with the added module) into a new system with enhanced functionality.

To achieve the objects of this invention and attain its advantages, broadly speaking, this invention has three aspects. First, the present invention concerns a portable platform comprising a flat panel display and at least one docking bay disposed on a rear side of the flat panel display including means for securing and electrically integrating an external module to the docking bay. Second, the present invention concerns a system for integrating an external module having a module connector to a portable electronic platform having a flat panel display, a central processing unit and a system bus, the system comprising at least one docking bay disposed on a rear side of the flat panel display including at least two rails and an electrical connector, wherein the external module is slid in between the two rails to be secured to the rear side of the flat panel display, and wherein the module connector is connected to the electrical connector of the docking bay to electrically connect or integrate the module to the central processing unit via the system's data bus. A third aspect of the present invention concerns the configuration of a module to be externally connected to a portable platform including a flat panel display and at least one docking bay disposed on a rear side of the flat panel display, the docking bay including two outer rails and an electrical connector, the module comprising at least two inner rails, and a module connector. The module is secured to the docking bay by sliding the two inner rails of the module between the two outer rails of the docking bay, and the module connector is connected to the electrical connector of the docking bay to electrically connect the module to the central processing unit via the system's data bus.

The accompanying drawings which are incorporated in and which constitute part of this specification, illustrate an embodiment and implementation of the invention and, together with the description, explain the principles of the invention.

BRIEF DESCRIPTION OF DRAWINGS

FIG. 4 is a partial side view taken along cutting line 4—4 in FIG. 2 that illustrates the elevations of the rear of the preferred embodiment of the present invention illustrated in FIG. 2.

FIG. 9 is a partial side view of the preferred embodiment, similar to FIG. 4, that illustrates one of the modules from FIG. 8 docked to the preferred embodiment.

DETAILED DESCRIPTION OF THE PREFERRED EMBODIMENT

Reference will now be made in detail to the preferred embodiment of the present invention as illustrated in the accompanying drawings. Whereever possible, the same reference numbers will be used throughout the drawings and the following description to refer to the same or like parts.

Figure 1:
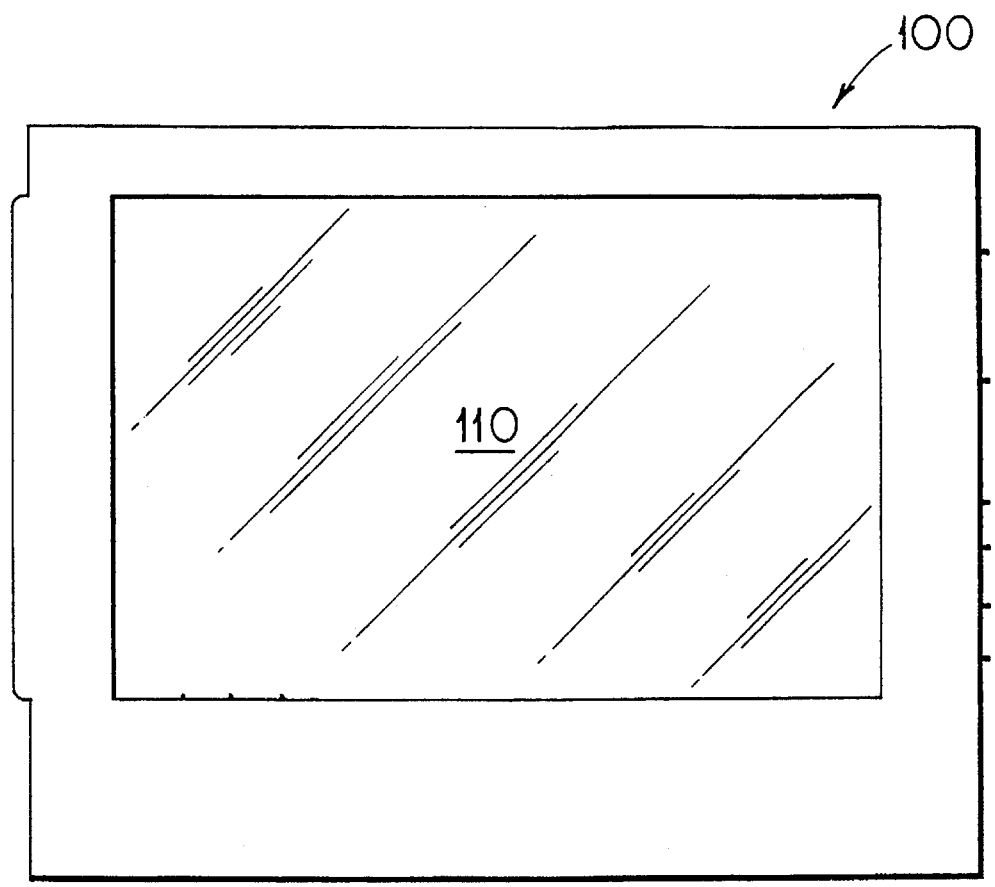
FIG. 1 is a front view of the preferred embodiment of the present invention.

FIG. 1 illustrates a front exterior view of a preferred embodiment. The platform 100 illustrated in FIG. 1 includes a flat panel display 110. In the preferred embodiment, the platform 100 includes a fully functioning personal computer system with a central processing system (e.g., an 80486 microprocessor manufactured by Intel Corporation of Texas, U.S.A.) and memory (RAM and ROM) connected to a data bus (e.g. ISA or industry standard architecture bus).

Figure 10:
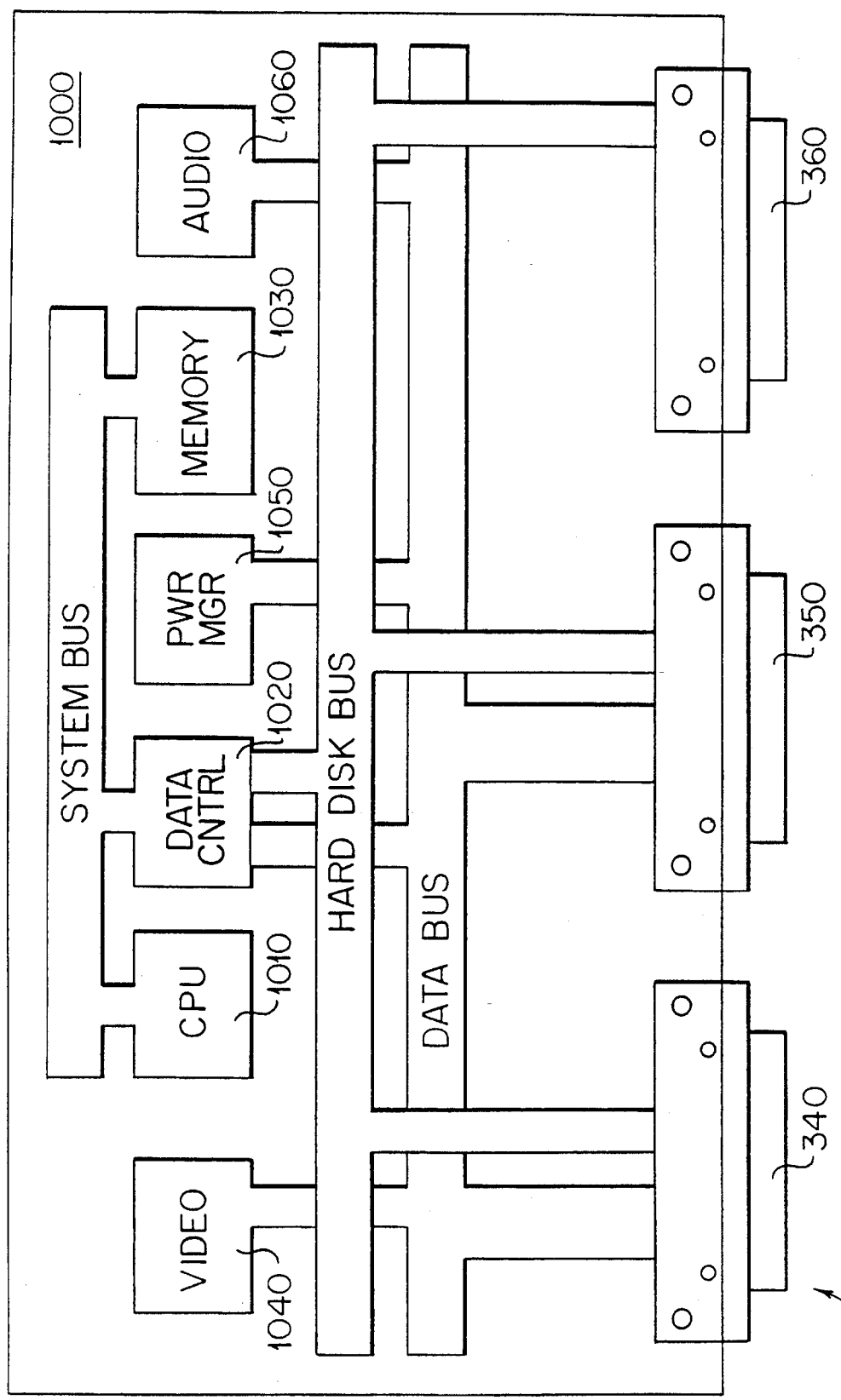
FIG. 10 is a block diagram showing the components of the preferred embodiment.

The system architecture 1000 is illustrated in FIG. 10. The system architecture 1000 includes a system bus and a data bus. The system bus connects the central processing unit (CPU) 1010, the data controller 1020, and memory 1030. The data bus, on the other hand, connects the video processor (or controller) 1040, data controller 1020, power manager 1050, and audio controller 1060. The system 1000 also includes a hard disk bus connected between connectors 340, 350, 360 and the data controller 1020. The system bus is used to transmit information in the form of electrical signals between CPU 1010, data controller 1020, and memory 1030. The data bus is used to transmit data in the form of electrical signals between the video processor 1040, data controller 1020, power manager 1050, and audio controller 1060. Finally, the hard disk bus transmits data in the form of electrical signals between data controller 1020 and one or more hard disk drives that may be in external modules (discussed below) connected to connectors 340, 350, and 360.

In the preferred embodiment, the CPU 1010 is a standard microprocessor, for example, an Intel 80486 microprocessor. The function and operation of such a CPU is well known in the art. So too are the functions of the video processor 1040 that controls operations of the flat panel screen 110 and the interface to a pen (discussed below), the audio controller 1060 is an analog to digital converter that controls sound functions (similar to a Soundblaster card manufactured by Creative Labs), and the memory 1030 that consists of RAM memory.

The data controller 1020 and power manager 1050 are also conventional. The data controller 1020 controls the data flow on the data bus and hard disk bus and provides an interface to mass storage (e.g. hard disk drives), and the power manager 1050 controls the electrical state of all components in system.

In the preferred embodiment, the platform 100 is a pen-based system that permits users to interface with the platform 100 using a the flat panel display 110 and the pen (not shown). Pen-based systems are well known and, thus, will not be described in detail. However, the present invention may also be implemented using other means for interfacing with the platform 100, for example, a keyboard may be connected to the platform 100.

In the preferred embodiment, the flat panel display 110 is a monochrome LCD display. However, the display 110 may be any other type of flat panel including active or passive matrix color LCD displays and plasma displays.

Figure 2:
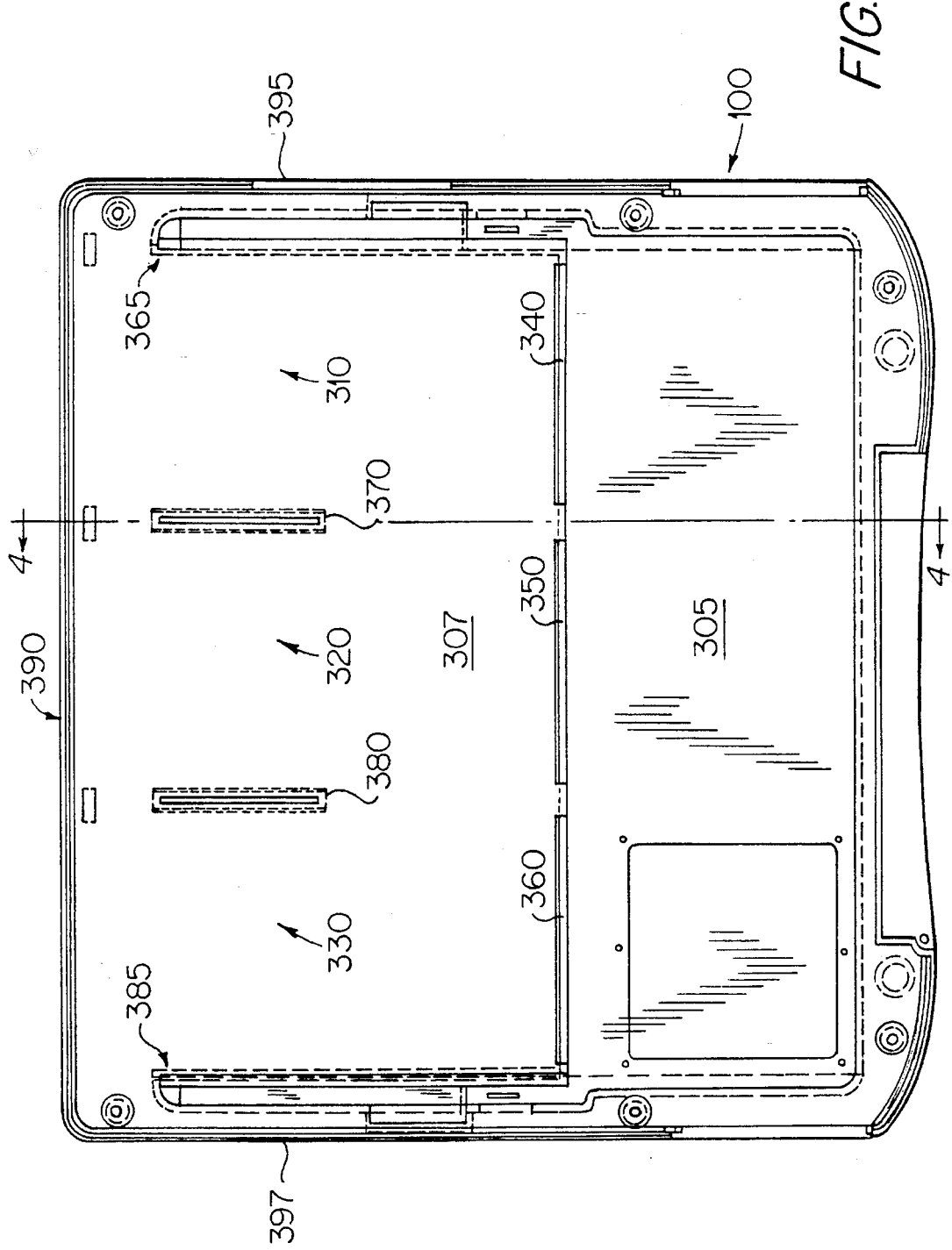
FIG. 2 is a rear view of the preferred embodiment of the present invention illustrated in FIG. 1.
Figure 3:
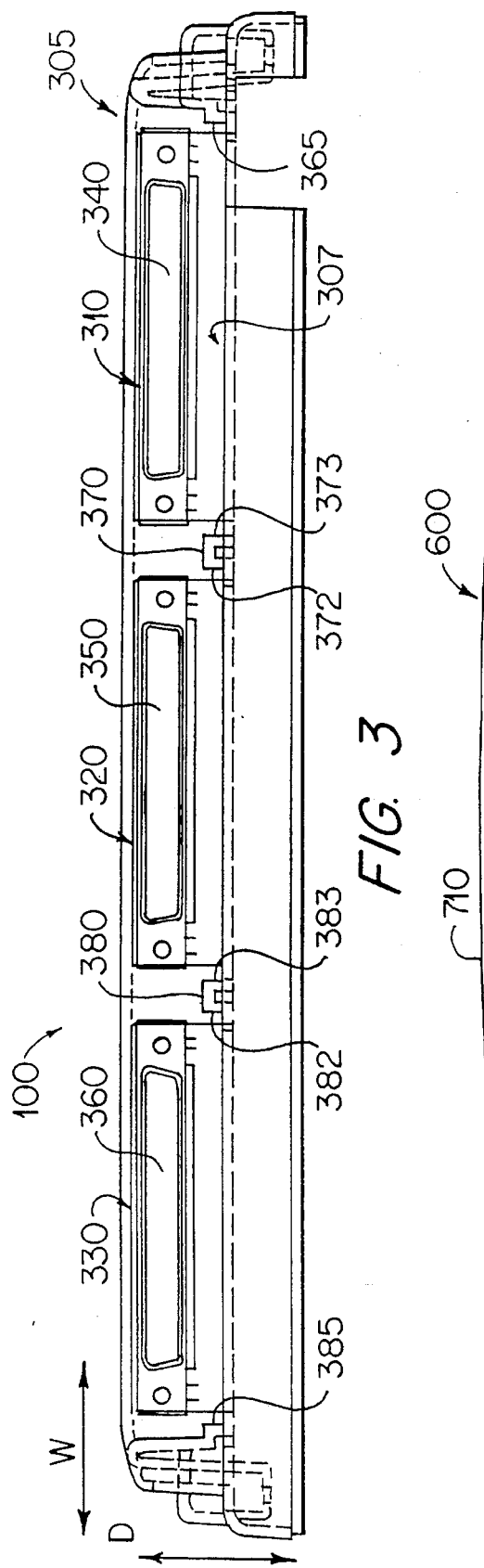
FIG. 3 is a top view of the preferred embodiment of the present invention illustrated in FIG. 1.

FIG. 2 is a rear exterior view of the platform 100. On the rear 395 of the platform 100 are three docking bays 310, 320, and 330. The bays 310, 320, and 330 are in an indented area (or niche) 307 of the rear of the platform 100 that is indented such that an area 305 extends rearward in a direction indicated by arrow R (FIG. 4) further than indented area 307. Thus, the depth of the indented area 307 is less than the depth of area 305. As shown in FIGS. 2 and 3, docking bays 310, 320, and 330 include connectors 340, 350, and 360, respectively, outer guides 365 and 385, and inner rails 370 and 380. The docking bays are used to dock, secure, and electrically connect external modules to the platform 100. As described more fully below, modules are slidably attached onto the docking bays from the top 390 of the platform 100.

Although there are three docking bays 310, 320, and 330, as will be discussed in detail below, one, two, or three external modules may be docked to the platform 100. Other embodiments may include more or fewer docking bays. Because the docking bays 310, 320, and 330 are limited in width W by the outer guides 365 and 385, the length and depth of the external modules that may be docked to the platform 100 may vary considerably in different embodiments of the invention, in accordance with varying widths of docking bays 310–330. Of course the width of the modules that may be docked to the platform 100 may be limited by the size of other modules that may also be docked to the platform 100 at the same time and by the size of other docking bays.

In some embodiments, however, the width of modules may not be restricted by the outer guides 365 and 385. For example, the depth D of a module may permit it to extend rearward from the rear 307 of the platform 100 and, as long as it clears area 305 above either one or both of the outer guides 365 and 385, the width of the module may extend out from either or both sides (395 and 397) of the platform 100.

In the preferred embodiment, the connectors 340, 350, and 360 are standard pin connectors that transfer industry standard signals (e.g., ISA, serial, or parallel) of the type used to electrically connect modules to the data bus of the platform 100. In other words, in the described embodiment the connectors 340, 350, and 360 are female connectors for receiving male connectors. Using pin connectors ensures that modules having many different functions can be docked to the platform 100. Of course, the connectors 340, 350, and 360 must be compatible with the male connectors of the modules (e.g., a module using pins for a serial transmission via its connector must connect to a connector on the platform 100 that is also using corresponding pins for serial transmission). Other embodiments may use male connectors as connectors 340, 350, and 360.

The outer guides 365 and 385 are formed by a dovetailed groove in the rear of the platform 100. The outer guides 365 and 385 are formed at an eight (8) degree angle from the area 307. Outer guide 365 permits a user to slide a module down from the top 390 of the platform 100 to be docked, for example, at docking bay 310, depending upon the size and type of the module. Similarly, outer guide 385 permits a user to slide a module down from the top 390 of the platform 100 to be docked, for example, at docking bay 330.

The inner rails 370 and 380 preferably are T-shaped with dovetailed sides 372, 373 (FIG. 3) and 382, 383 (FIG. 3), respectively, in the rear of the platform 100. In a manner similar to the outer guides 365 and 385, the angled sides 372, 373 and 382, 383 of each of the rail 370 and 380, respectively, are formed at an 8° angle from the area 307. Inner rail 370 guides external modules for docking at bays 310 and 320, while inner rail 380 guides external modules for docking at bays 320 and 330. One exterior side of inner rail 370 and outer guide 365 define bay 310, while the other exterior side of inner rail 370 and an exterior side of inner rail 380 define bay 320. Likewise, the other exterior side on rail 380 and the outer guide 385 define bay 330.

The configuration of the docking bays 310, 320, and 330 can, perhaps, be seen better in FIG. 3, which is a top view of the platform 100. FIG. 3 also shows the connectors 340, 350, and 360; the outer guides 365 and 385; and the inner rails 370 and 380. Looking at FIG. 3 it is clear that the platform 100 places few constraints on the size of external modules that may be connected to the platform 100. Specifically, the depth D of external modules that may be connected to platform 100 is limited only slightly by the size of the platform 100.

Similarly, the height of external modules that may be connected to platform 100 is not really limited by the dimensions of platform 100. This lack of size limitation is illustrated in FIG. 4. FIG. 4 shows a partial side view of the platform 100 viewing a single one of the docking bays, for example, bay 320, with connector 350 at line 4—4 in FIG. 2. The top 390 of platform 100 defines one of the outer peripheries of the platform 100. Nevertheless, the top 390 of the platform 100 places no restrictions on the length L (see FIG. 5) of external modules that may be connected to the platform. For example, an external module that protrudes above the top 390 of the platform 100 may be connected to connector 360.

Figure 6:
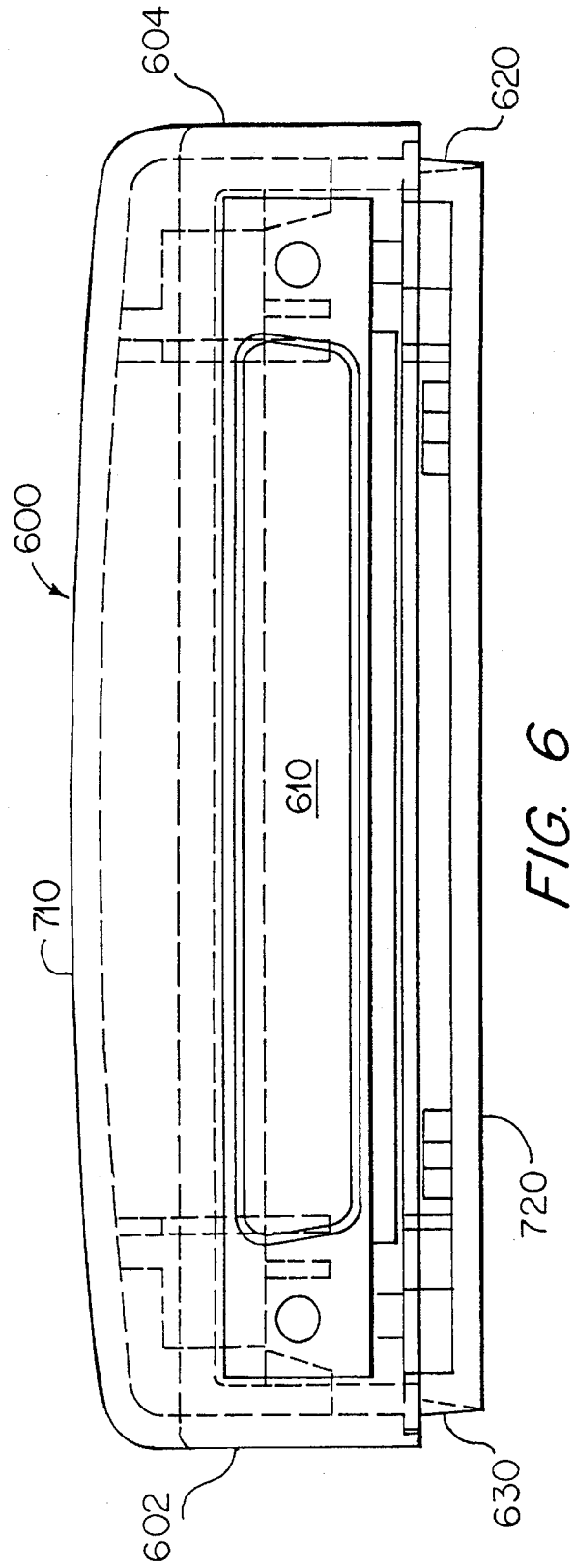
FIG. 6 is a top view of the example module illustrated in FIG. 5.
Figure 5:
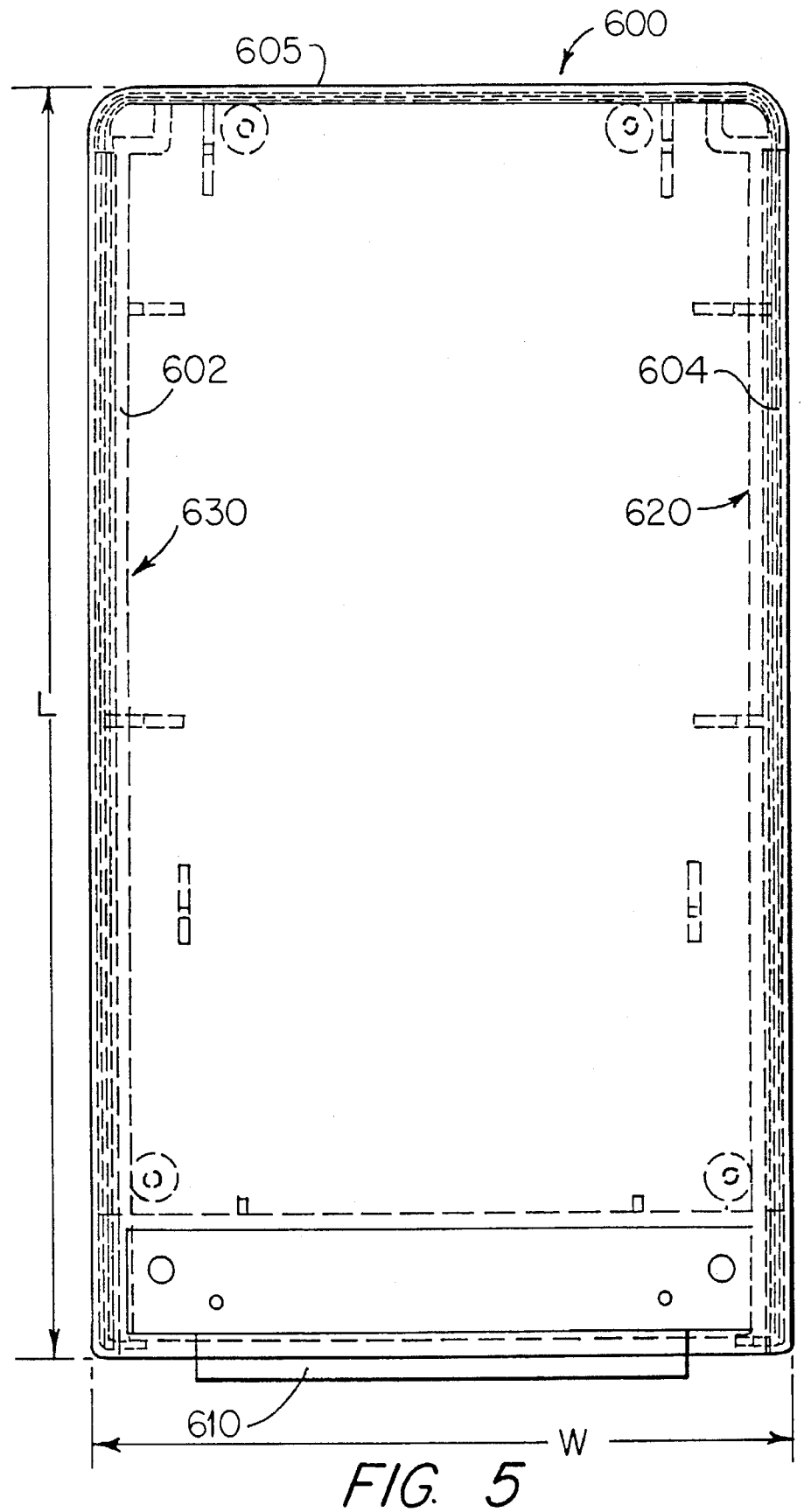
FIG. 5 is a rear view of an example of a module that may be used with the preferred embodiment of the present invention illustrated in FIG. 1.
Figure 7:
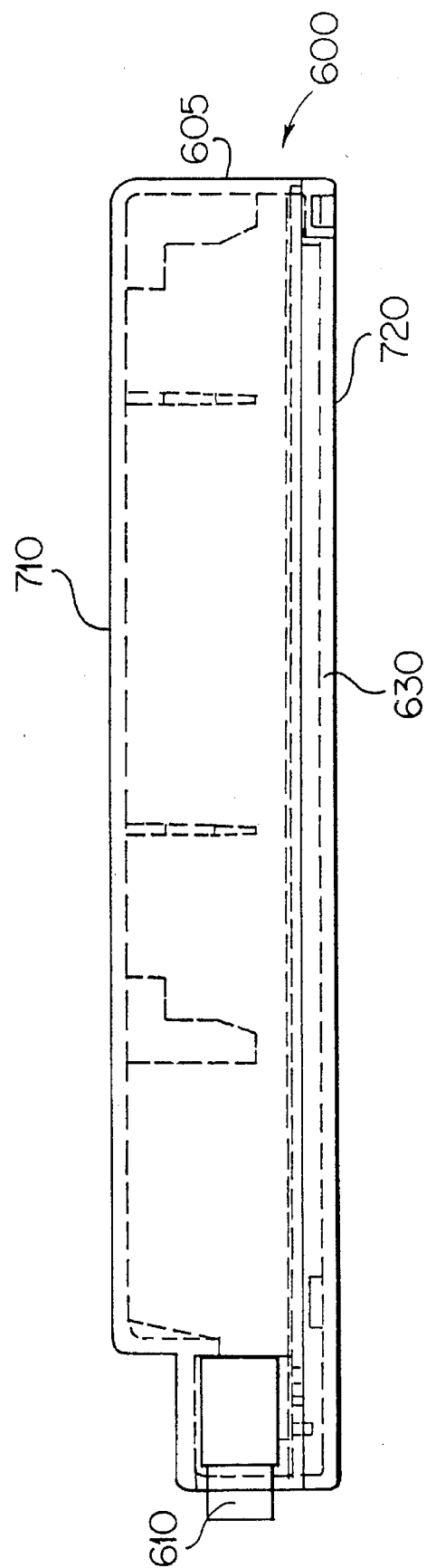
FIG. 7 is a side view of the example module illustrated in FIG. 5.

Referring now to FIGS. 5–7, the configuration of an exemplary external module will be explained. FIG. 5 shows an external module 600 that may be docked to the platform 100. A width of module 600, defined by the exterior side walls 602 and 604, respectively, is such that three modules of similar sizes may be docked at platform 100. In other words, three modules of the size illustrated in FIG. 5 by module 600 may be docked at platform 100, each to one of the bays 310, 320, and 330.

In other embodiments, other size modules may be connected to the platform 100. For example, a first external module of the size illustrated by module 600 in FIG. 5 may be docked at the platform 100 using bay 310 (and connector 340), while a second external module approximately twice the width W of module 600 may also be docked at the platform 100 using the bays 320 and 330 and one or both connectors 350 and 360. Alternatively, a single module that is three times the width W of module 600 may be docked at the platform 100 using bays 310, 320, and 330 and either one, two, or three of the connectors 340, 350, and 360. Other modular configurations will be apparent to those skilled in the art.

Returning to FIG. 5, the length L of module 600 may vary. Similarly, the depth D and width W of the module may also vary. In FIG. 5, the length of the module 600 is defined by the top 605 and a connector 610. The module 600 also has grooves 620 and 630 for sliding the module 600 into a docking bay, for example, bay 310, of the platform 100. Using the bay 310, the grooves 620 and 630 would slide into and between the outer guide 365 and the inner rail 370. Using the bay 320, however, the grooves 620 and 630 would slide into and between the inner rails 370 and 380. Finally, using the bay 330, the grooves 620 and 630 would slide into and between the inner rail 380 and the outer guide 365. Thus, in the preferred embodiment, the grooves 620 and 630 are at 8° angles.

Current CD-ROM devices are larger than the width of a single docking bay of the described embodiment. Thus, in other configurations where the module 600 is a double size module (that is, a module that uses two docking bays) to accommodate the size of, for example, a CD-ROM device, the grooves 620 and 630 would slide into and between outer guide 365 and the inner rail 380 or the outer guide 385 and the inner rail 370. Finally, where the module 600 is a triple size module (that is, a module that uses three docking bays), the grooves 620 and 630 would slide into and between the outer guides 365 and 385.

The connector 610 on the module 600 is the male counterpart to female connectors 340, 350, and 360 in each of the respective docking bays 310, 320, and 330 on platform 100. As suggested above, the connector 610 may be connected to one or more of the connectors 340, 350, and 360.

It may also be possible to have multiple connectors such connector 610 on a module. Thus, using a double size module with two connectors connected to the platform 100 using the bays 310 and 320, the module would be connected to both the connectors 340 and 350 on the platform 100. Similarly, using a double size module with two connectors connected to the platform 100 using the bays 320 and 330, the module would be connected to both the connectors 350 and 360 on the platform 100.

Finally, where the module 600 is a triple size module, the connector 610 may be connected to either one of the connectors 340, 350, or 360. If the triple size module has two connectors they may be connected to any two of the platform connectors 340, 350, or 360, and if the triple size module has three connectors they may be connected to all three of the platform connectors 340, 350, or 360.

FIG. 6 shows a top view of the module 600. A frontside 710 of the module 600 is illustrated as being cut away because, as explained above, the width of the module 600 may vary. A rear side 720 of the module 600, however, is static and includes the grooves 620 and 630 for, as explained above, docking the module 600 into one of the bays 3110, 320, or 330 on platform 100. FIG. 7 is a partial side view of the module 600. FIG. 7 is a side, split view of the module 600 and illustrates the connector 610, and the top 605, front 710, and rear 720 of the module 600. FIG. 7 also shows the groove 630 of the module 600.

Figure 8:
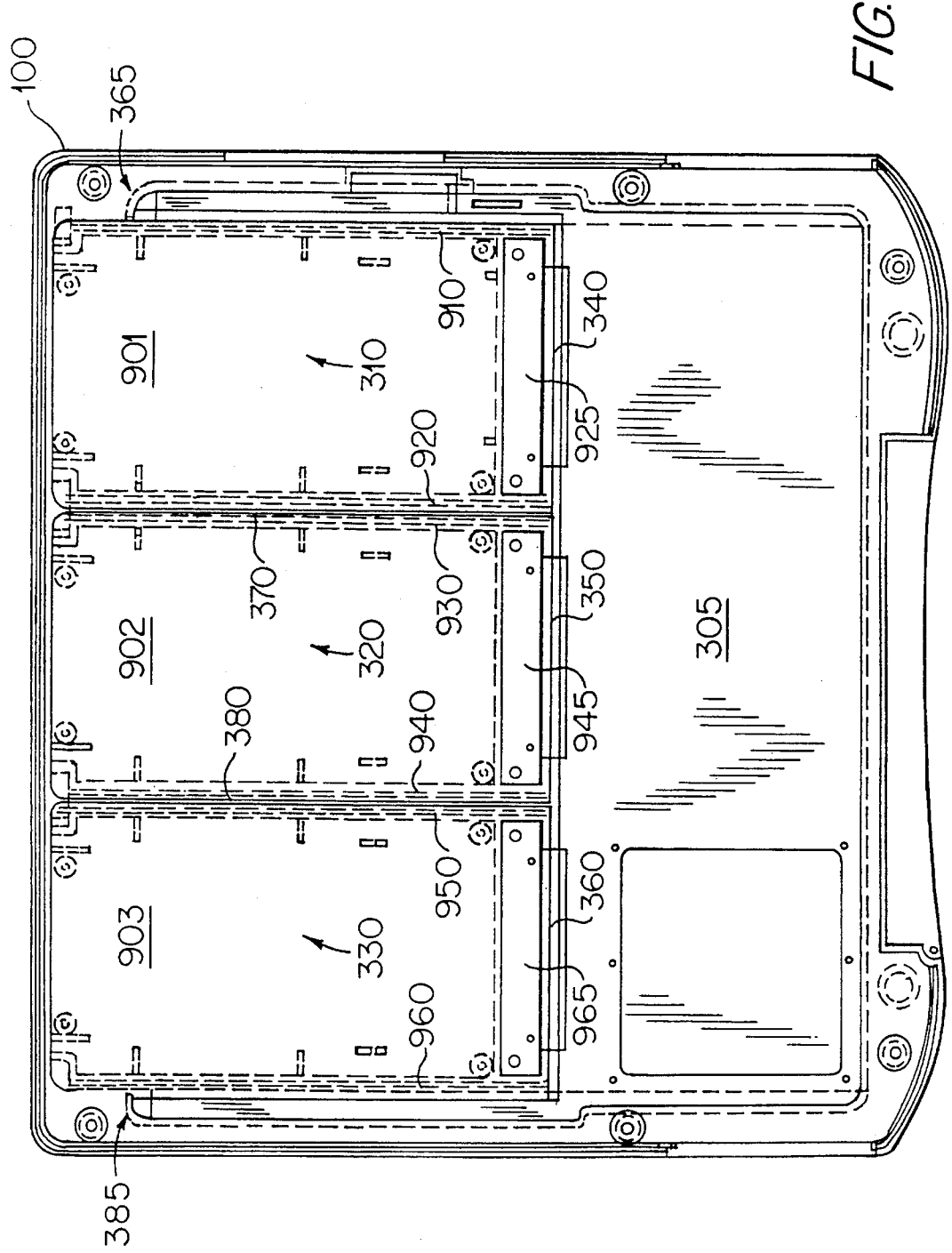
FIG. 8 is a rear view of the preferred embodiment of the present invention illustrated in FIG. 1 with three modules of the type illustrated in FIGS. 5-7 docked or connected to the preferred embodiment.

FIG. 8 shows three modules 901, 902, and 903 (similar to module 600 illustrated in FIGS. 5–7) docked to platform 100 using the bays 310, 320, and 330, respectively. Modules 901–903 are docked by slidably inserting the modules in direction T until the connector on a module and a connector in a docking bay mate. Module 901 is docked in the bay 310 using the outer guide 365 and the inner rail 370 of the platform 100 and the grooves 910 and 920 of the module 901, and the connector 340 of the platform 100 connected to the connector 925 of the module 901. Similarly, the module 902 is docked in the bay 320 using the inner rails 370 and 380 of the platform 100 and the grooves 930 and 940 of the module 902, and the connector 350 of the platform 100 connected to the connector 945 of the module 902. The module 903 is docked in the bay 330 using the inner rail 380 and the outer guide 385 of the platform 100 and the grooves 950 and 960 of the module 903, and the connector 360 of the platform 100 connected to connector 965 of the module 903. As discussed above, alternative configurations with modules of different sizes may also be docked in bays 310, 320, and 330.

FIG. 9 illustrates a side, split (or cutaway) view of a single module (like module 600 illustrated in FIGS. 5–7) docked in one of the bays 310, 320, or 330, for example, bay 310, on platform 100. Using bay 310, with connector 610 of module 600 is connected to connector 340. The groove 630 of the module 600 is show next to the inner rail 370 that separates bays 310 and 320. Thus, to dock module 600 in bay 310, the user slides the module 600 from the top 390 downward in direction T, securing the module 600 between the outer guide 365 and inner rail 370 of bay 310.

Thus, in the preferred embodiment many modules of different sizes may be docked to platform 100 in various different configurations. This results in an extremely flexible platform which, as will be explained below, changes configuration each time an external module(s) is docked in one of the bays and nearly instantly transforms the platform with the added module(s) into a new system with enhanced functionality that neither the platform nor the module(s) independently had.

Persons skilled in the art will recognize that the present invention described above accomplished the objects discussed above and more. They will also recognize that modifications and variations may be made to this invention without departing from the spirit and scope of the general inventive concept. While the preferred embodiment uses guides and rails to connect external modules to the platform, other systems for guiding and connecting the external modules into docking bays may also be used. Additionally, other examples of external modules are independently functional personal digital assistants (for example, NEWTON™ manufactured by Apple Computer Corporation) and mass storage devices (for example, hard disk drives). This invention in its broader aspects is therefore not limited to the specific details or representative methods shown and described.

We claim:

1. A portable electronic platform system, comprising:

a plurality of rails on an exterior side of a portable electronic platform defining a plurality of bays, wherein at least two of the rails define one bay;

a first external module connectable to the portable electronic platform, wherein the first external module utilizes a first one of the plurality of bays when connected to the portable electronic platform; and a second external module connectable to the portable electronic platform, wherein the second external module utilizes the first one of the plurality of bays and a second one of the plurality of bays when connected to the portable electronic platform.

2. A portable electronic platform system, comprising:

a plurality of rails on an exterior side of a portable electronic platform defining a plurality of bays, wherein at least two of the rails define one bay;

a first external module slidably connectable within the rails to at least one of the plurality of bays; and a second external module slidably connectable within the rails to at least two of the plurality of bays.

3. A portable electronic platform, comprising:

an exterior surface of the portable electronic platform defining a niche portion; and a plurality of rails disposed within the niche portion defining a plurality of bays, wherein a first external module is slidably connectable within the rails to at least one of the plurality of bays and a second external module is slidably connectable within the rails to at least two of the plurality of bays.

4. A computer platform system, comprising:

portable electronic platform with at least three rails defining two bays on an exterior surface of the portable electronic platform;

a first external module slidably connectable to a first bay within a first rail and a second rail; and a second external module slidably connectable to the first bay and a second bay within the first rail and a third rail, straddling the second rail.

5. A portable electronic platform system having an electronic platform and a plurality of external modules connectable to the electronic platform, wherein at least three rails on an exterior surface of the electronic platform define at least two bays such that a first one of the external modules, which is of a predetermined width, is slidably connectable to at least one of the bays within the rails that define that one bay, and a second one of the modules, which is of a predetermined width greater than the width of the first one of the external modules, is slidably connectable to least two of the bays within at least one rail that partially defines one of the bays and another rail that partially defines another one of the bays.

\* \* \* \* \*